June 25, 1940.　　　　N. E. BROOKE　　　　2,205,827
RAKE
Filed June 15, 1939　　　　4 Sheets-Sheet 1

Inventor,
Norman E. Brooke
By Henry E. Stauffer
His Atty.

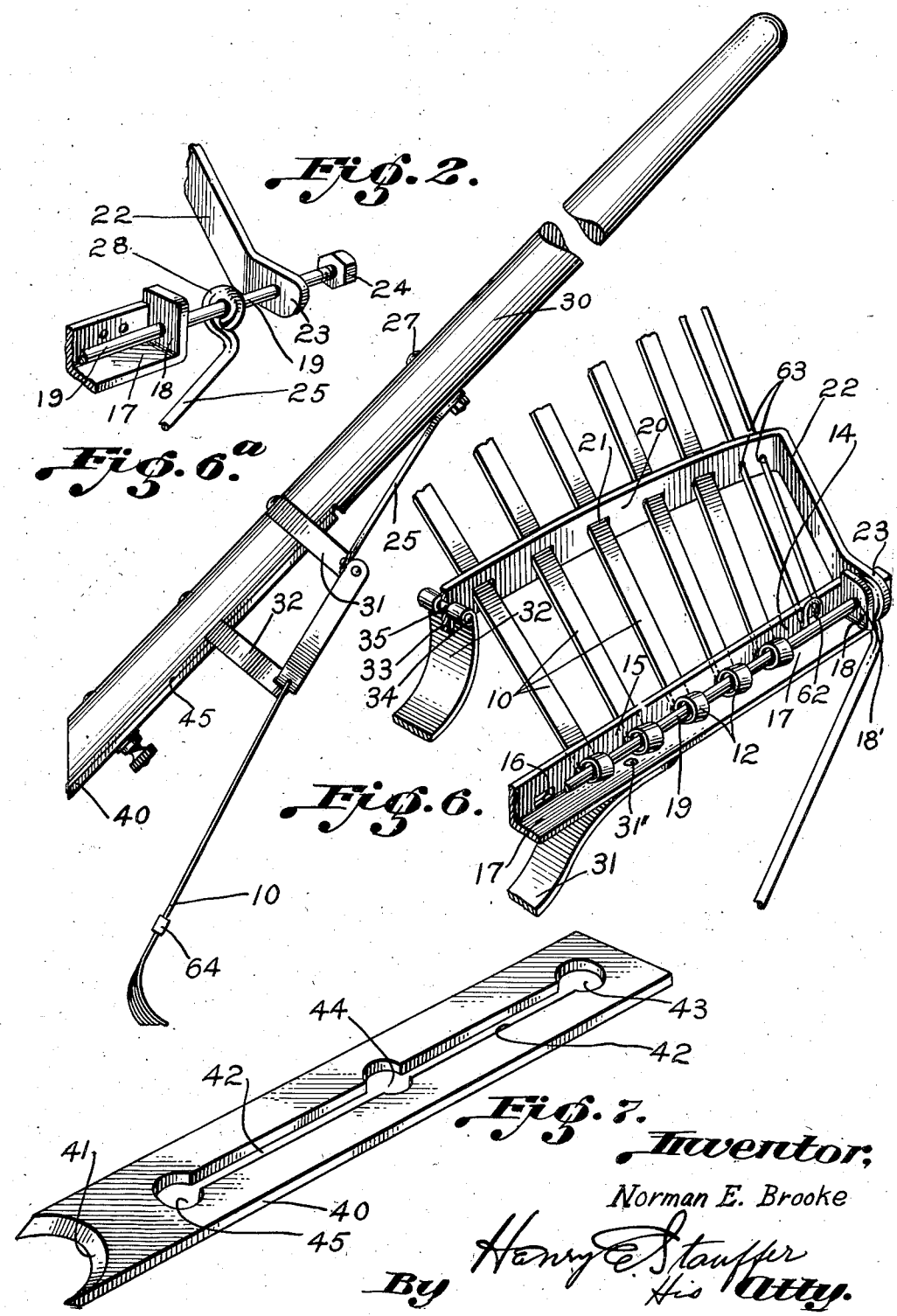

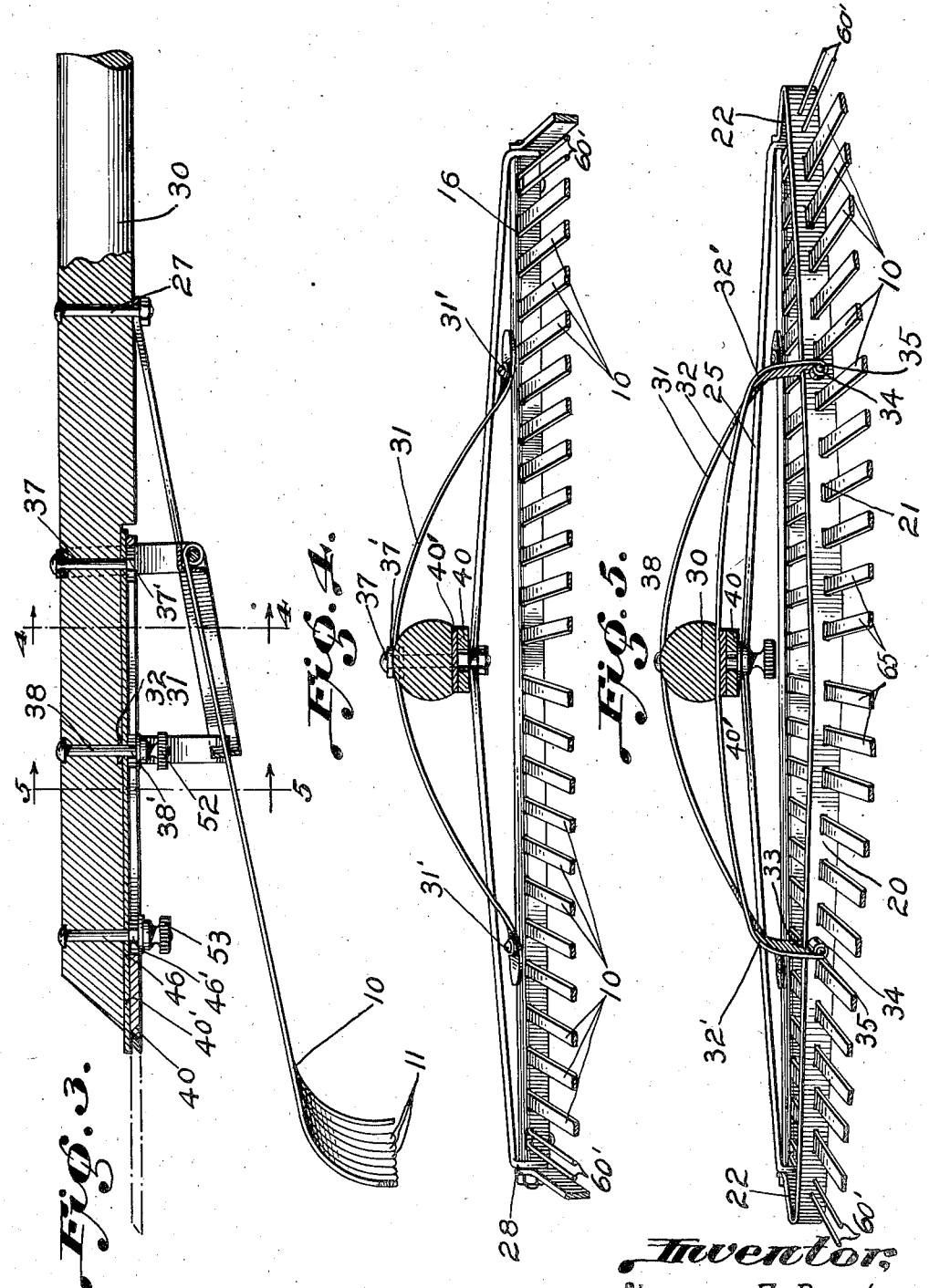

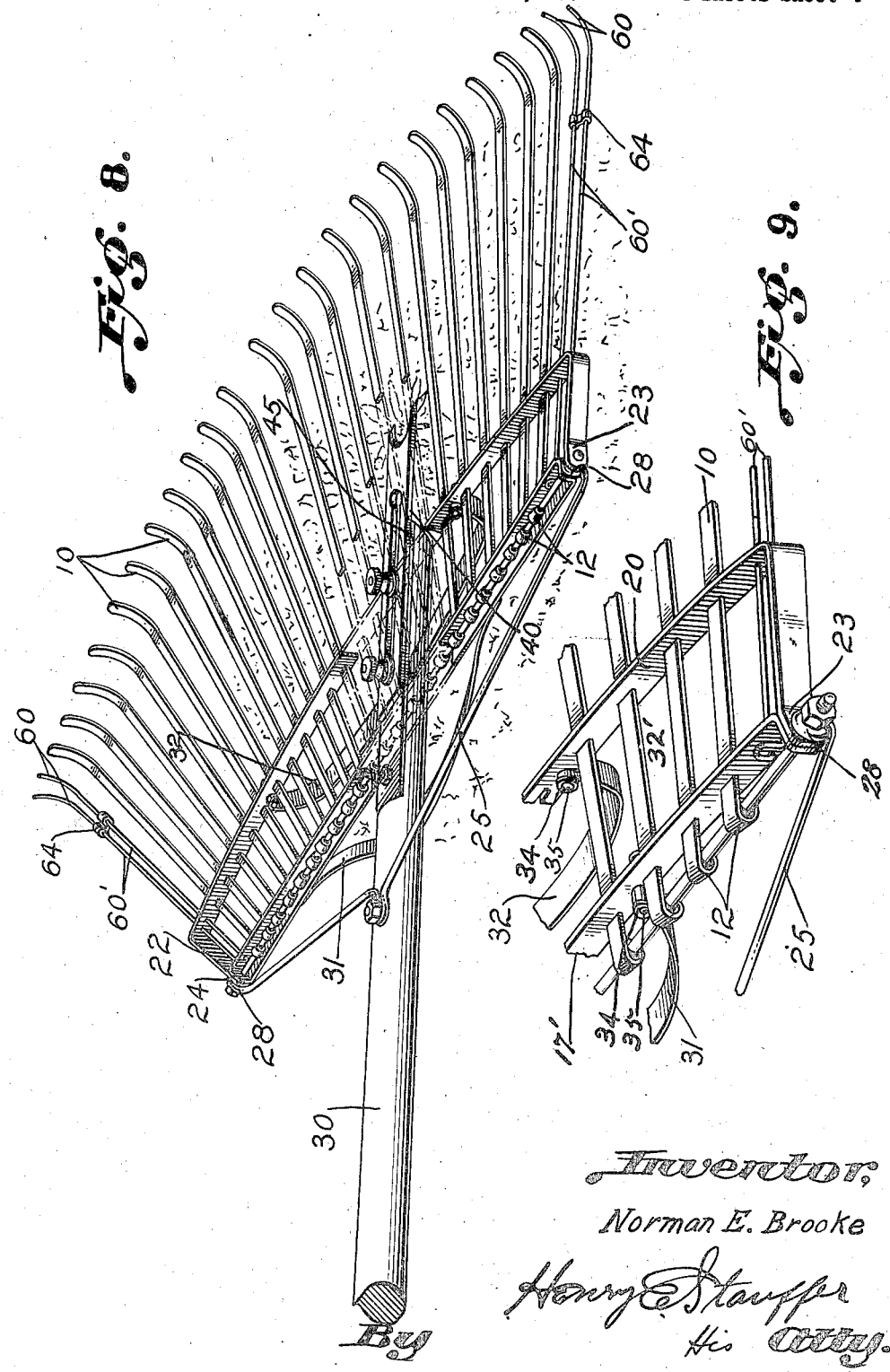

Patented June 25, 1940

2,205,827

UNITED STATES PATENT OFFICE 2,205,827

RAKE

Norman E. Brooke, Washington, D. C.

Application June 15, 1939, Serial No. 279,351

15 Claims. (Cl. 56—400.17)

This invention is in hand rakes, and more particularly in rakes of the broom type.

One of the objects of the invention is to obtain the great flexibility and ease of handling of the broom rake; and at the same time, retain the body strength of the so-called stiff back rake.

A further object of the invention is to provide a combined weed cutter and rake, by means of which weeds can be readily severed, and then removed from the turf without the making of unsightly holes in the bed of grass.

A further object is to secure a combined cutter and rake, wherein the action of the weed cutter may be readily observed between the tines of the rake, and wherein the rake is provided with special tines or claws for weeding and cleaning purposes.

Another object of the invention is to so mount the rake head with respect to the handle as to obtain substantial elasticity, yet maintain the necessary rigidity between the two members.

A still further object of the invention is to provide a rake having flexible tines, and a handle set at such an angle thereto that the sweeping action of a broom rake may be achieved when the handle of the implement is in acute angular relationship with the ground.

In the drawings:

Fig. 2 is a side view of the implement shown in Fig. 1, illustrating the angular relationship which normally exists between the rake proper, and the handle and weed cutter.

Fig. 3 is a longitudinal section taken through the rake and cutter on the line 3—3 of Fig. 1, looking in the direction of the arrows.

Fig. 4 is a cross section of the tool taken on the line 4—4 of Fig. 1, looking in the direction of the arrows.

Fig. 5 is a cross section taken on the line 5—5 of Fig. 1, looking in the direction of the arrows.

Fig. 6 is a detached enlarged view of a portion of the rear part of the implement, showing how the rear ends of the tines are secured in place.

Fig. 6a is an enlarged disassembled view of the connections between the bridles and rear bar for holding the tines.

Fig. 7 is a perspective view of the weed cutter detached from the other parts of the tool.

Fig. 8 is a perspective view of the implement, illustrating the position of the parts as the cutter is used to sever weeds.

Fig. 9 is a view similar to Fig. 6, but showing a modification of the method of supporting the tines.

Figure 1:
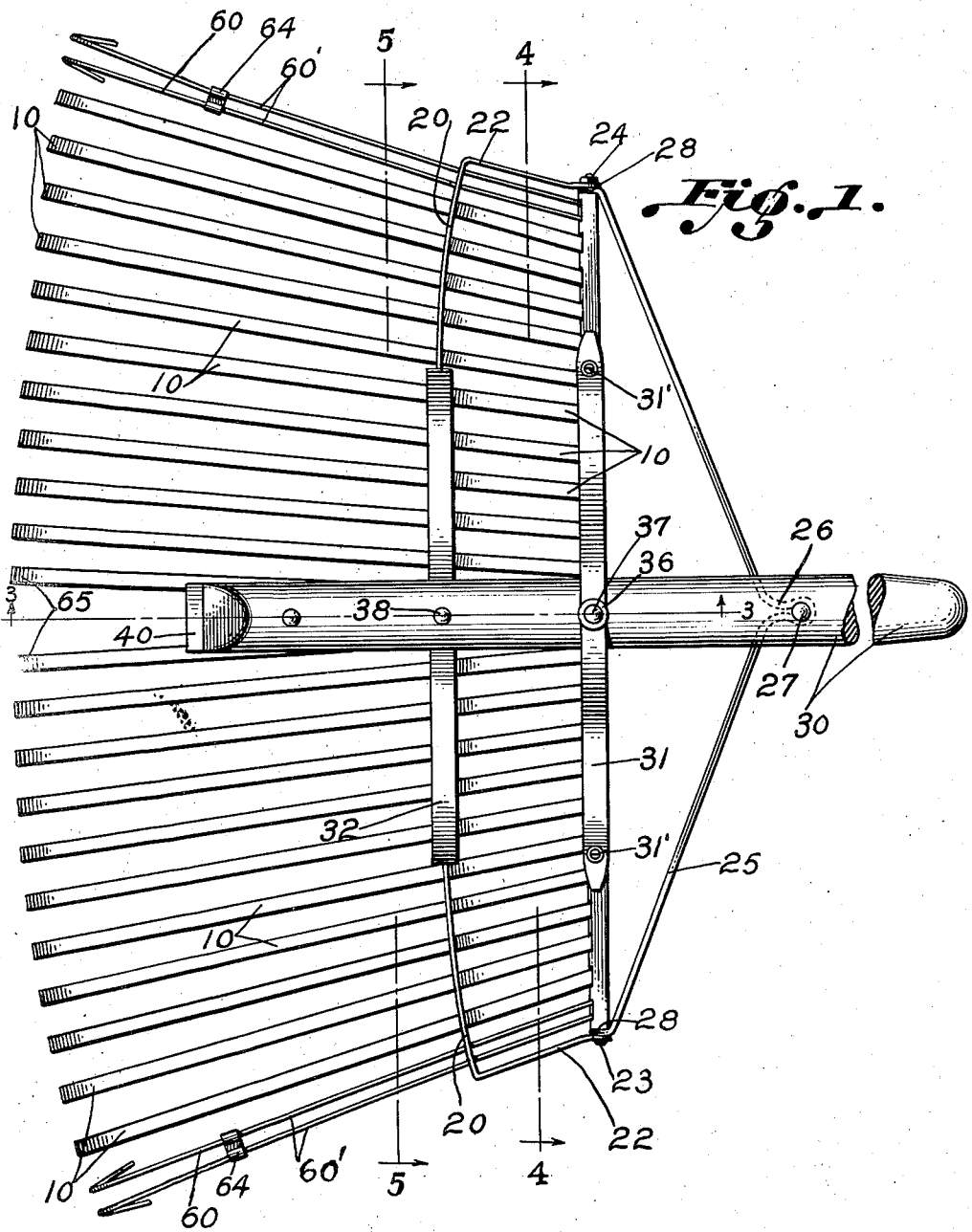
Fig. 1 is a plan view of the combined rake and cutter, looking from above.

Referring to the accompanying drawings, wherein like parts are similarly numbered, the invention comprises a plurality of spring tines 10, constituting the rake proper, a handle 30, and a cutter 40. The tines are of uniform hardness and elasticity. They are made of spring steel, and are so mounted that breakage due to the character of the material is reduced to a minimum; and, if breakage should occur, replacement of the broken part is easily accomplished.

The number of tines 10 to be used in any particular case is dependent upon the size of the rake and the closeness of the tines. As here shown, 22 tines are used, but this number is merely illustrative, and the number actually employed will depend upon the requirements of the particular rake.

The tines 10 have their front ends bent permanently, as at 11, while their rear ends are formed into eyes 12, Figs. 6 and 9, for purposes of mounting, as will be presently explained.

Stretched across the rear portion of the tines are what are technically termed "bridles" for supporting and holding the tines. The rear bridle 14 is here shown (Fig. 6) as an angle iron, with one member 15 thereof provided with openings 16 through which the tines 10 pass somewhat freely. The other member 17 of the angle bar extends laterally over the eyes 12 of the tines, so as to cover and protect the same, as best shown in Figs. 1 and 6. The ends of the side or cover 17 are bent at right angles, as at 18, and are provided with holes 18', which form bearings for the rod 19. The eyes 12, in the ends of the tines 10, are loosely mounted on the rod 19, which supports the rear ends of the tines.

Another bridle 20, having therein openings 21, one for each tine, supports the tines forward of the first mentioned bridle. The exact distance between the first and second bridles is a matter of trial and preference. The position of the front bridle with respect to the rear bridle will affect to some extent the flexibility of the tines, and so its position will depend more or less on the characteristics the rake is to have. In practice, a distance of two or three inches between the bridles has been found to be about correct; but, as just stated, this is dependent upon many factors, and is best determined by experiment. The bridles 14 and 20, together with the tines 10, constitute the rake head, or body of the rake.

The ends 22 of bridle 20 will preferably be bent at substantially right angles, as shown best in Figs. 1 and 6, and the extreme ends 23 further bent into a position substantially parallel with the ends 18 of the bridle 14. Each extreme end is provided with an opening through which the rod 19 passes, and a nut 24 on the end of the rod 19, or equivalent fastening means, holds the parts together. Nuts 24 may be placed one on either end of rod 19, or one end may have a head 23 thereon while the other has a nut, as 24. To replace a broken tine, it is only necessary to take off the nut 24, withdraw the rod 19, and remove the broken tine. A new tine may be inserted by passing the front end thereof through openings 16 and 21 of the respective bridles, and replacing and securing the rod 19. This exact construction is illustrative only, and other means for mounting and securing the tines will suggest themselves.

A brace 25 of suitable material supports the rake head laterally, with respect to the handle 30. This brace, in the form here shown, is made of a single rod, and is formed with approximately straight sides, and a loop 26 at its middle. A bolt, as 27, passes through this loop and into or through the handle 30. This loop 26 and its fastening means are merely typical, and any other method of fastening may be used. Eyes 28 are formed on the ends of brace 25, and these are secured between the right angled parts 18 of the bridle 17, and the deflected parts 23 of the bridle 20. The rod 19, when in position, passes through these eyes 28. The construction of this connection is best shown in Fig. 6a, where the elements are somewhat separated. Again, this arrangement may be varied at will, without departing from the spirit of the invention.

The openings 21 in the bridle 20 are somewhat farther apart than are the openings 16 in the flange 15 of the bridle 14. The effect of this is that, when the tines are in place, and the parts are all secured together, the tines will fan out more or less, the amount depending upon the difference in the spacing of the two sets of openings. Since the tines are all the same length, their ends will, when the parts are assembled as described, stand in the form of an arc, as best shown in Fig. 1.

The rake handle 30 is shown best in Figs. 1 and 2; but is shown in longitudinal section in Fig. 3; and in transverse section in Figs. 4 and 5. The handle itself is typical, and does not need special description; but the method of its mounting is novel and highly important, and will be described in detail.

The handle is fastened alongside of the rake head proper by means of special springs. The expression "alongside of" as used herein is intended to define a relationship between the rake head and the handle such that the two parts overlap for a part of their lengths. Thus, the handle will normally extend over the rear portion of the rake head and as far forward as the front bridle, and may extend further. The spring mounting is shown generally in Figs. 1 and 2; and in detail in Figs. 3 to 5. The overlapping of head and handle is best shown in Figs. 1, 2 and 3. Secured to the rake head, and preferably to the bridles thereof, are springs 31 and 32. Spring 31, as shown in Figs. 1 and 4, is merely a length of flat spring steel, bowed considerably, and with its ends secured by screws or rivets 31' to the flange 17 of the rear bridle 14. The other spring 32, instead of being bowed in a single curve, as is the spring 31, has its ends formed in curves 32' of relatively short radius, and the material between these portions 32' formed into a single long and relatively flat curve. When pressure is brought to bear on this relatively flat portion, the ends of this portion will force laterally the short curved portions 32', and the main portion of the spring will be depressed evenly, thus preventing any buckling of the spring on either side of the handle. This spring is connected to the bridle 20 by having its ends notched, as at 33, and formed into eyes 34 through which pass pins 35, one through either eye, the pins passing also through the bridle 20.

The springs 31 and 32 and the method of their mounting are illustrative only; this spring arrangement can be much varied, and still maintain the principle of the invention. This particular mounting, however, while giving the rake considerable flexibility, nevertheless provides a very strong construction.

In the form shown in Fig. 9, the rear bridle 14' is a flat bar, similar to the bar 20 forming the front bridle of that construction, and the rear spring 31 is mounted and secured in place on this bridle, just as the front spring 32 is secured to the bar 20. The ends are notched and formed into eyes 34', through which pass pins 35', the pins passing also through the bridle 14'.

The plane of the rake head normally assumes an acute angular relation to the plane of the handle, as best shown in Figs. 2 and 3. By "plane of the handle" is meant a plane such as, if passed longitudinally through the center of the handle, would divide the same into equal upper and lower semi-cylinders; in other words, with the tine ends 11 resting upon a flat surface, and the handle parallel to that surface, the plane of the handle, as herein referred to, is a horizontal plane. While various means may be used to effect this relation, as here shown, the handle passes between the two springs 31 and 32; that is, spring 31 is secured above the handle and spring 32 beneath the handle. This has been found to give about the preferred angular relation between the rake and its handle, but of course other methods of spring mounting can be used. With the rake and its handle supported in some angular relation, about as shown, the gathering power of the implement is quite unusual. The material gathered is rolled along, and this rolling action, and the elasticity of the freely mounted tines, which vibrate readily and rapidly, but not in unison, when the rake is lifted at the end of a stroke, are very effective in keeping the tines free and unclogged. The springs connecting the rake head to the handle aid in this result. These springs, together with the elastic tines, give a very high elasticity to all elements of the rake.

The angular mounting of the rake body on the handle is important. The implement may be held as a rake is usually held, and used as a rake is ordinarily used, that is, it may be pulled toward the user; yet, when thus held and used, the tines are brought into contact with the surface of the ground at an angle more or less approaching the angle at which a broom normally contacts the surface being swept.

Attention is directed to the fact that, when the rake is in use, the pressure on the spring 31 is almost always in an upward direction, while that on spring 32 is in a downward direction. This is the reason for making spring 32 with the short radius curves 32'. With this construction, the spring withstands strong downward pressure without buckling. Other types of springs may be used, but they should function in approximately the same way. With respect to spring 31, on which the pull is always upward, no special problem arises.

A bolt 37 (Fig. 3) passes through handle 30 and spring 31; and, preferably, is provided with a washer 36 (Fig. 1) beneath the head of the bolt, in order that the spring may bend around the edges of the washer instead of at the hole through which the bolt 37 passes. A nut 37', beneath the handle, secures the bolt. In a similar manner, a bolt 38 passes through the handle 30 and through spring 32, but no washer, such as 36 of bolt 37, is here necessary. This bolt has on its under side a nut 38'. In the preferred construction, the handle 30 is grooved slightly at the point at which it is secured to spring 32, so that the face of spring 32 will be about flush with the surface of the handle when the parts are assembled. This means for securing the handle to the springs is illustrative only, and other suitable means may be used.

The lower end of the handle 30 is here shown as cut away on its under side to receive a plate 40' which is secured by bolt 46 and nut 46', and by the previously described bolts 37 and 38 and their cooperating nuts 37' and 38', respectively.

Mounted adjustably on the handle 30, at the lower end thereof, is a cutter 40. This is shown detached from the other elements, in Fig. 7. Essentially it is a simple cutting blade having a beveled concave cutting edge 41, a longitudinal slot 42, and notches or enlargements 43, 44 and 45, in the slot. This cutter is adjustably mounted on the plate 40' on the under side of the handle, and may be projected or retracted as desired, or easily removed for sharpening or replacement. Its relation to the rake proper is best shown in Figs. 2 and 3, and its use is illustrated in Fig. 8. This mounting of the cutter is illustrative only, and any other preferred construction may be used. If desired, the cutter may be mounted on the top of the handle instead of beneath the same.

The openings or notches 43, 44 and 45 pass over the nuts 37', 38' and 46', and the latter constitute a means for locking the cutter in place, either retracted or projected, as the case may be. But other satisfactory securing means may be used. Bolts 38 and 46 are prolonged beyond their nuts, and are provided with additional milled or other nuts 52 and 53, as shown best in Fig. 3. These nuts have washers beneath them, or enlarged bases which serve as washers. To project the cutter to operating position, the nuts 52 and 53 are loosened until the cutter 40, with its openings 43, 44 and 45, can be lifted off the nuts 37', 38' and 46', and then the cutter is moved forward, with the slot 42 passing over the shanks of bolts 46 and 38. It can be moved down and fastened by nuts 52 and 53 where desired, which will usually but not necessarily be at a point such that notches 43 and 44 can be respectively set over nuts 38' and 46', whereupon the nuts 52 and 53 may again be tightened. The cutter 40 is thus locked in projected position wherever desired, and is ready for use. To retract the cutter, the nuts 52 and 53 are loosened until the cutter can be moved back to engage nuts 37', 38' and 46', and the first mentioned nuts are again tightened. The above is merely one means for projecting, holding and retracting the cutter; other means will of course suggest themselves. Applicant does not wish to be restricted to this exact arrangement.

Adjacent the margins of the rake head are special tines or claws 60, one on either side of the structure. As here shown, there are but two of these claws, but the invention is not limited to this specific number, and any preferred number may be used. As shown, each tine comprises two members 60', 60'. Each tine is made of a single wire folded at about the middle thereof, and with its doubled end bent at substantially a right angle, as best shown in Fig. 6. The doubled member is forced through a slot 62 in the flange 15 of the member 14, which is in all substantial respects like slots 16, before described. The ends of the members 60', 60', are then passed through individual holes 63 in the bridle 20. One or more clamps 64 hold the branches 60', 60' of these tines 60 in proper relation to each other. These special tines are generally of the same length and shape as the tines 10, although as here shown they are of round instead of flat stock; as a matter of fact the cross-sectional shape of the wire is not material.

These wire tines 60 may be used for many purposes. They have been found to be very useful in removing leaves and grass from narrow recesses, as for instance along walls and walks; but their most important use is in connection with the weed cutter.

As already explained, the cutter and rake proper normally have a distinct angular relation to each other. Certain of the tines, as those numbered 65, 65, Fig. 1, are shown spaced more widely apart than the other tines. The cutter is in line with this widened space, so that when the implement is turned over for use of the cutter, as shown more particularly in Fig. 8, the workman can readily observe, between these widely spaced tines 65, 65, the operation of the cutter. The cutter can be properly placed with respect to the plant to be cut, and the cutting thrust properly made. Once a root has been severed, the rake, which is nicely balanced and easily handled, may be readily turned over, and either of the tines 60, 60, used as a claw to effectively remove the severed weed from the ground without a destructive effect on the turf. The loose weeds can then be readily raked away. While the center tines 65, 65 are somewhat more widely spaced than the others, it is to be understood that they are not spaced so widely as to interfere with their normal raking function.

The angular relation between the handle of the rake and the head provides this additional advantage. As described, the weed cutter is mounted on the end of the handle. And the handle is shown as extending more or less across the head, but not beyond the same. The angular relation between the handle and the head makes it possible to mount the cutter in such a way that it may be used to sever an unwanted growth beneath the ground, notwithstanding the fact that the cutting edge is behind the forward edge of the rake.

Minor changes in my construction, of course, are to be regarded as within the spirit of the invention. Round tines might, for example, be used instead of the flat tines heretofore described. In such case, the construction would, in essential particulars, not vary from my preferred form of rake, although the apertures in the bridles would preferably be round rather than elongated.

I claim:

1. A rake comprising a handle, a rake head disposed alongside of the handle, and a spring interconnecting the handle and the rake head.

2. A rake comprising a handle, a rake head disposed alongside of the handle, and at least one transverse spring interconnecting the handle and the rake head.

3. A rake comprising a handle, a rake head disposed alongside of and at an acute angle to the handle, and elastic means interconnecting the handle and the rake head.

4. A rake comprising a handle, a rake head disposed alongside of the handle and comprising bridles, and tines supported by the bridles, and spring means interconnecting the bridles and the handle in spaced relation one to the other and so as to provide an acute angular relationship between the plane of the head and the plane of the handle.

5. A rake comprising a handle, a rake head disposed alongside of the handle and comprising bridles, and spring tines secured in the bridles, and a transverse spring interconnecting each bridle and the handle.

6. A rake comprising a handle, a rake head disposed alongside of the handle, at least one transverse spring interconnecting the head and the handle, and a brace extending from the handle to the sides of the rake head and pivoted to the latter, so that the head can move as the spring yields.

7. A rake comprising a handle, a rake head disposed alongside of the handle, at least one transverse spring interconnecting the head and the handle, the plane of the rake head normally forming an acute angle with the plane of the handle, and a brace extending from the handle to the rake head and pivoted to the latter, so that the head can move as the spring yields.

8. A rake comprising a handle, a rake head disposed alongside of the handle, and at least one transverse spring interconnecting the head and the handle, the plane of the rake head normally forming an acute angle with the plane of the handle.

9. A rake comprising a handle, a rake head disposed alongside of the handle, transverse spring means interconnecting the rake head and the handle, and a brace extending from the handle to the rake head and pivoted thereto so that the head can move as the spring yields.

10. A rake comprising a handle, a rake head disposed alongside of the handle, and spring means interconnecting the rake head and the handle, the rake head comprising a bridle member, a plurality of normally diverging spring tines each having an eye in one end thereof, and means cooperating with the eyes in the tines for releasably locking the tines in the head.

11. A rake comprising a handle, and a rake head mounted alongside of the handle for yielding cooperation therewith, the plane of the rake head being normally at an acute angle with the plane of the handle, and the rake head comprising at least one bridle member, a plurality of normally diverging spring tines each having an eye in one end thereof and supported relatively loosely in the bridle, and releasable locking means cooperating with the eyes in the tines for fastening the tines securely in the head.

12. A rake comprising a handle, and a rake head disposed alongside of the handle and including bridles having tine slots therein, a rod cooperating with the bridles, tines each having an eye at one end through which the cooperating rod passes freely, and each passing loosely through the slots of the bridles, and transverse supporting springs one mounted on either bridle, one above and the other beneath the handle.

13. A rake comprising a handle, and a rake head including a forward bridle, a rear bridle, and tines supported by and secured in the bridles, and spring means for attaching the forward bridle alongside of handle in spaced relation thereto and means for attaching the rear bridle to the handle.

14. A rake comprising a handle, a rake head having a plurality of tines, bridle means for holding and supporting the tines, means for supporting the rear portion of the rake head from the handle, and spring means for supporting the forward part of the head away from and alongside of the handle.

15. A rake comprising a handle, a rake head disposed alongside of the handle and having a plurality of tines, bridle means for holding and supporting the tines, spring means for supporting the rear portion of the rake head from the handle, and additional spring means for supporting the forward part of the head from the handle in spaced relation thereto.

NORMAN E. BROOKE.